Aug. 24, 1954   V. G. LARSEN   2,687,154
BEET TOPPER
Filed Aug. 20, 1951   7 Sheets-Sheet 2

INVENTOR
VIGGO G. LARSEN
By Fetherstonhaugh
ATTORNEYS.

Fig. 12.

INVENTOR
VIGGO G. LARSEN
BY Fetherstonhaugh
ATTORNEYS

Aug. 24, 1954

V. G. LARSEN 2,687,154

BEET TOPPER

Filed Aug. 20, 1951

INVENTOR
VIGGO G LARSEN
BY Featherstonhaugh &
ATTORNEYS

Patented Aug. 24, 1954

2,687,154

UNITED STATES PATENT OFFICE 2,687,154

BEET TOPPER

Viggo Gade Larsen, Picture Butte, Alberta, Canada

Application August 20, 1951, Serial No. 242,609

14 Claims. (Cl. 146—85)

My invention relates to a mechanism for cutting the toppings off root vegetables such as sugar beets and the like, and more particularly it relates to a topping mechanism which may be used in conjunction with a digging arrangement which digs the root vegetables from the ground and places them correctly oriented in position for feeding to the topper mechanism.

There are several known implements for digging beet roots and the like from the ground, and several arrangements are known which will dig them from the ground and feed them correctly oriented for subsequent operations. In the following specification I will describe my novel beet topper in association with a digging and orienting arrangement which I have found to be highly satisfactory. I wish it to be understood, however, that there are other orienting mechanisms available in association with which my novel beet topper may be used to advantage.

The beet topper mechanism according to my invention comprises a topper housing which is secured in position on the frame of a suitable agricultural trailer. Suitably the housing is cylindrical in shape and is mounted generally parallel to the trailer, with the open ends fore and aft. Gripping means are provided within the topper housing and means are provided for supplying sugar beets (or other root vegetables) to the topper housing so that the latter enter the housing root foremost. The said means are arranged to supply beets at predetermined intervals in timed relation to the sequence of operations of the topping mechanism. Push rod means mounted for longitudinal reciprocation centrally within the topper housing are arranged in association with means for producing timed reciprocation thereof through the topper housing whereby to contact the crown of the beet supplied to the topper housing and push the beet through the housing to an appropriate position for cutting off the root thereof. Actuating means for the gripper mechanism are mounted on the topper housing and arranged to actuate the gripper mechanism tightly to grip the toppings of the beet at the precise moment that it has reached the appropriate position under the influence of the push rod means. Rotating cutter means including a knife are appropriately mounted for rotation to the rear of the topper housing and are so arranged as to swing said knife past the rearward end of the topper housing as soon as the beet is in position and gripped by the gripper means, to lop off the head thereof. Means are further provided for releasing the gripper means following the cutting off of the head of the beet, and toppings extractor means are provided for removing the toppings which remain in the topper housing.

Suitably, according to the invention, the gripper means take the form of a plurality of gripper bars arranged longitudinally within the topper housing and pivoted thereon in such a way that the rearmost ends thereof may be swung radially inwardly to grip the toppings of a beet between them. The gripper bars are provided with a suitable spring loaded mechanism which is caused to be released to cause the gripper bars to grip when the push rod means is in its rearmost position, and a suitable mechanism is provided for recocking and retaining the gripper mechanism in its cocked position upon withdrawal forward of the push rod means, all of which will be described in greater detail below.

Suitably, according to the invention, the push rod means consists essentially of a longitudinal rod with a generally pointed end mounted substantially coaxially with the topper housing upon a reciprocable carriage provided with suitable means for reciprocation thereof back and forth to pass the push rod in and out of the topper housing. Also, suitably, the carriage is provided with means to effect release of the gripper mechanism as it moves into its most rearward position and recocking of the gripper mechanism as it moves forward again.

The means for reciprocating the carriage are preferably arranged to provide a certain lost motion at each end of the path of travel of the carriage and the carriage is preferably moved into its most rearward position by auxiliary means, all of which will be described in more detail hereinafter.

The accompanying drawings illustrate a beet topping mechanism according to the invention, mounted to operate in connection with a digging mechanism which digs the beets and places them correctly oriented on the conveyor leading to the topper itself.

In the drawings:

Fig. 6 is an enlarged perspective view of the mechanism that conveys the beets from the plowshares to the topper cylinder and it also shows a portion of the carriage, topper cylinder and cocking tripping cam which is mounted upon the carriage.

Figures 1, 9:
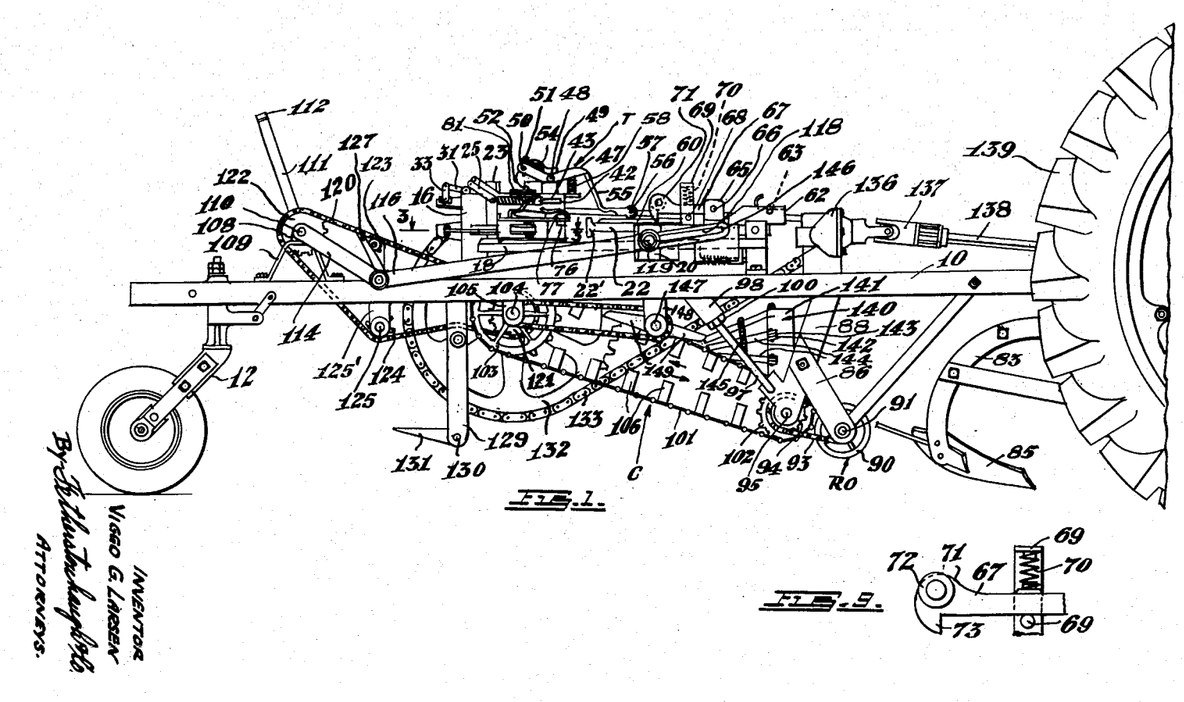
Fig. 1 is a side elevation of the machine, showing the general arrangement of parts.
Fig. 9 is an enlarged detail of the topper cylinder cocking levers.
Figures 2, 10:
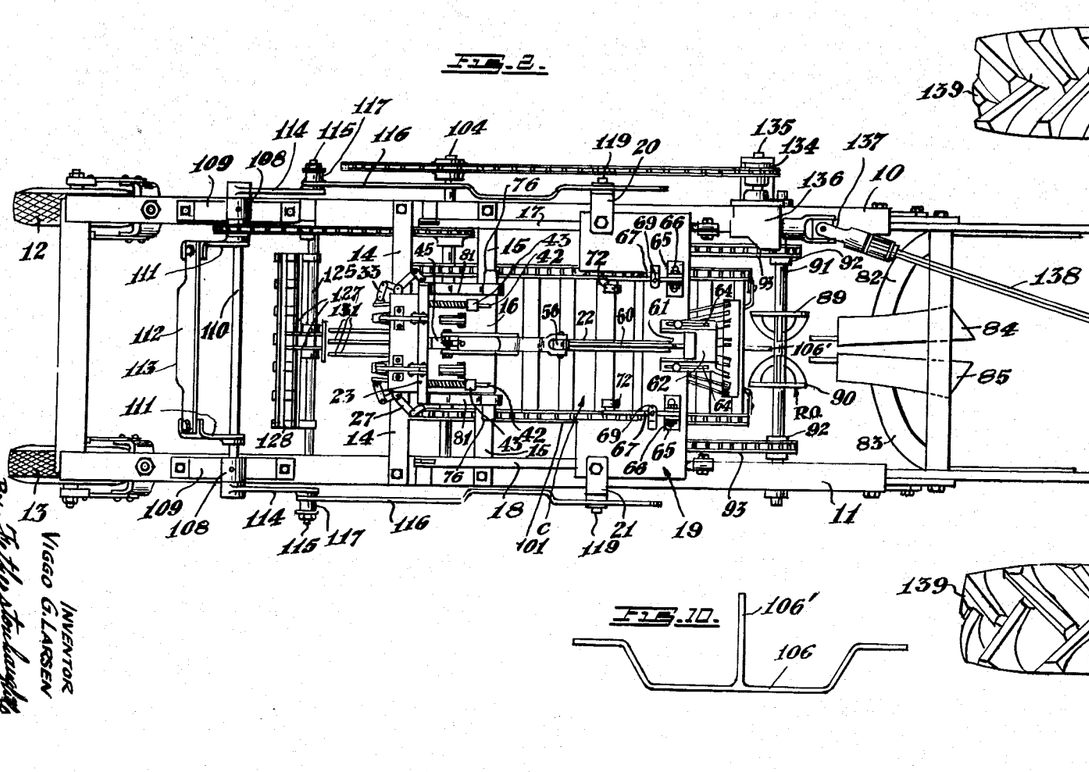
Fig. 2 is a top plan view of the digging and topping mechanism shown in Figure 1.
Fig. 10 is an enlarged detail of a trough-shaped conveyor member.

Referring now more particularly to the drawings, it will be seen from Figures 1 and 2 that the mechanism of the invention is mounted upon a frame consisting of the heavy longitudinal members 10 and 11, which are supported at the rear by the conventional castored wheel assemblies 12 and 13.

Cross-pieces 14 and 15 provide support for the topper housing in the form of the cylinder 16, which consists of a generally cylindrical casting of appropriate length and diameter. If the mechanism is to be used for topping sugar beets, the cylinder 16 may suitably be of the order of 7 inches in diameter and 12 inches in length. Supported on suitable brackets fixed to the frame members 10 and 11 are the slide bars 17 and 18, which are in generally parallel relationship to the frame members 10 and 11 respectively. Mounted upon the slide bars 17 and 18 is the carriage indicated generally at 19. The carriage is provided with suitable bushings to provide for reciprocating sliding motion back and forth on the slide bars 17 and 18, and is provided at either side with the lug members 20 and 21, which connect to a suitable mechanism for causing said reciprocating motion and which will be hereinafter described. The carriage 19 itself consists mainly of a heavy, flat, generally C-shaped plate, with the hollow of the C facing the topper cylinder 16. The hollow in the C is of a suitable size and its arrangement is such that when it is in its most rearward position on the slide bars 17 and 18, the arms of the C straddle the topper cylinder 16.

The push rod 22 is rigidly secured centrally on the frame in generally parallel relation to the slide bars 17 and 18 and in generally coaxial relationship to the topper cylinder 16. The push rod 22 is of such length that when the carriage 19 is in its rearmost position on the slide bars 17 and 18, the head 22' thereof is in a predetermined position within the topper cylinder 16 near the rear thereof.

Figure 3:
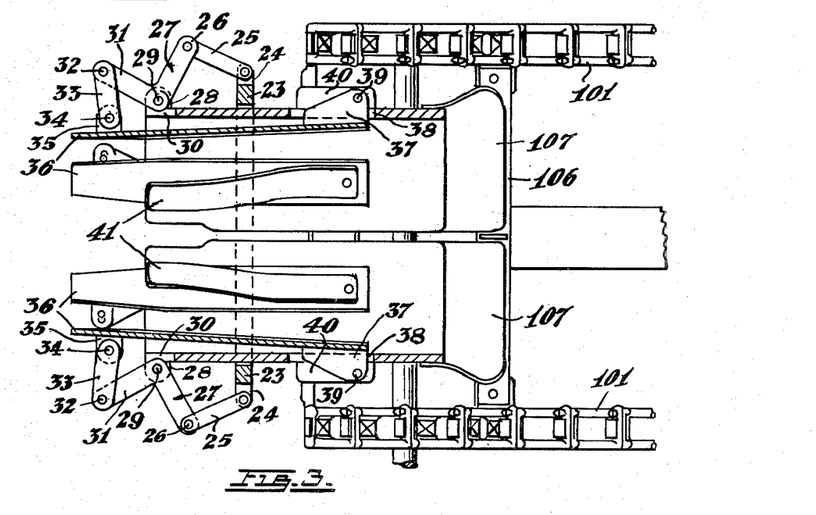
Fig. 3 is an enlarged cross-sectional detail of the top gripping mechanism taken along the plane 3—3 in Figure 1.

Surrounding the topper cylinder 16 and adapted for limited axial movement with respect thereto, is the ring 23. This ring is of relatively heavy cross-section and is provided with a suitable number, for instance four as shown, of lugs 24. Each lug 24, as will be seen most clearly in the detail in Figure 3, is pivotally connected to a link 25, which in turn is pivotally connected, as at 26, to one arm of a bell crank 27. Suitable means, such as brackets 28, are provided on the topper cylinder 16, to provide for the pivoting of each bell crank 27, as at 29, and the topper cylinder 16 is suitably cut away, as at 30, to provide clearance for the elbows of the bell cranks 27. The arms 31 of the bell cranks 27 are pivoted at 32 to the links 33, which are pivoted at their other ends, as at 34, to the ears 35, which are provided on the gripper bars 36. Each gripper bar 36 is provided at its foremost end with the ear 37, which extends through a suitably formed slot 38 in the topper cylinder 16 and is pivoted for angular radial movement, as at 39, at a pivot point which is preferably external to the casing of the cylinder 16, the pivot being supported by suitable brackets 40 secured to the exterior of the topper cylinder 16. The lower two gripper bars 36 are preferably provided with the leaf springs 41, which are secured, for instance, by welding to the gripper bars 36 at the foremost ends thereof, but which at their rearmost ends curve to a certain extent inwardly and away from the gripper bars 36.

From the description in the previous paragraph, it will be apparent that if the ring 23 is moved towards the rear, the bell crank and linkage mechanism described will cause the gripper bars 36 to pivot radially inwards within the topper cylinder 16, and vice versa.

Figure 5:
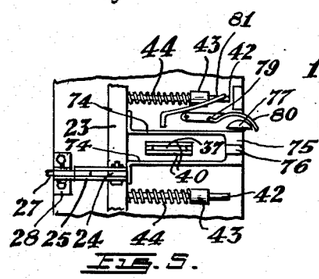
Fig. 5 is an enlarged detailed view of the gripper cocking mechanism.
Figure 7:
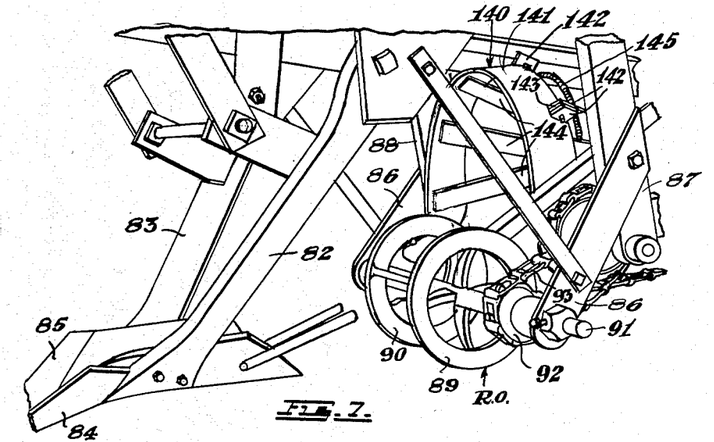
Fig. 7 is an enlarged perspective view which shows the ploughshares, root orienting device and means for retaining and timing the feeding of the beet roots into the topper cylinder.
Figure 8:
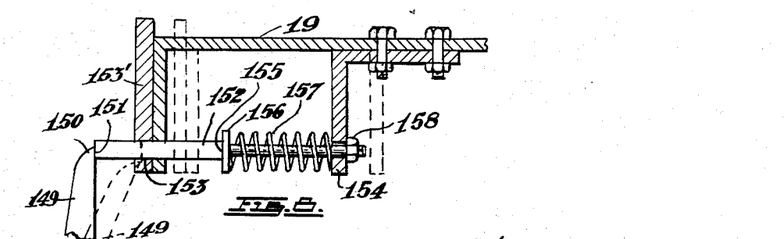
Fig. 8 is an enlarged detail of an auxiliary carriage actuating device.
Figure 11:
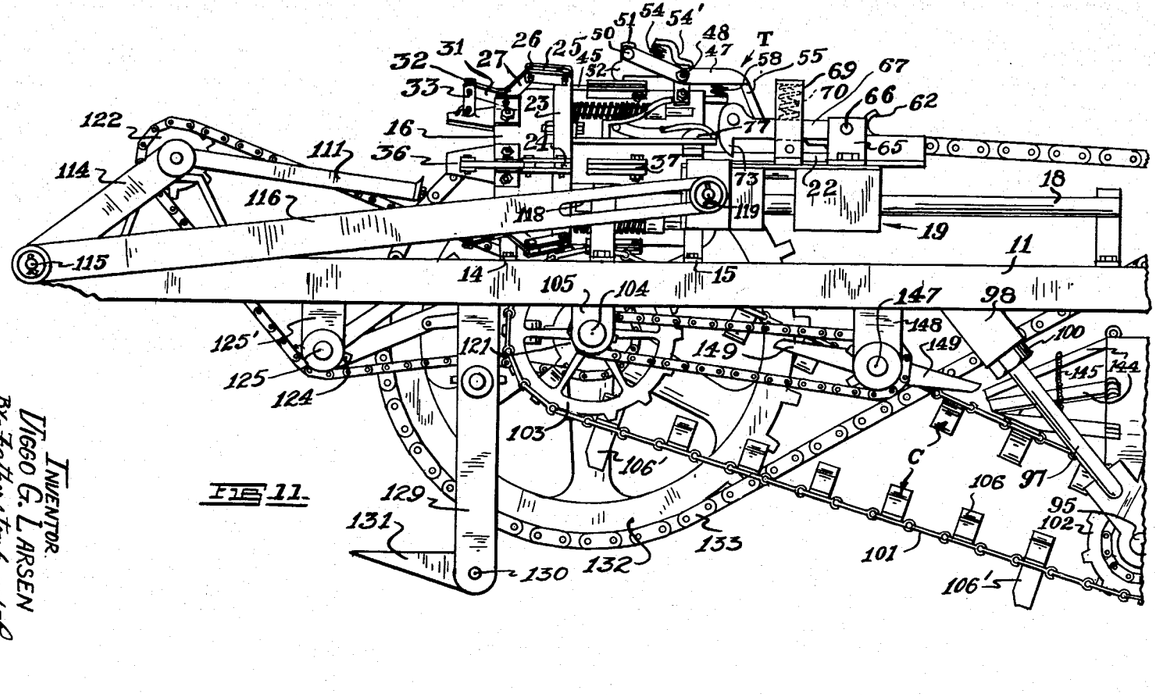
Figure 11 is an enlarged side elevation of the rear portion of the machine showing the topping mechanism near the rearward limit of its travel.
Figure 12:
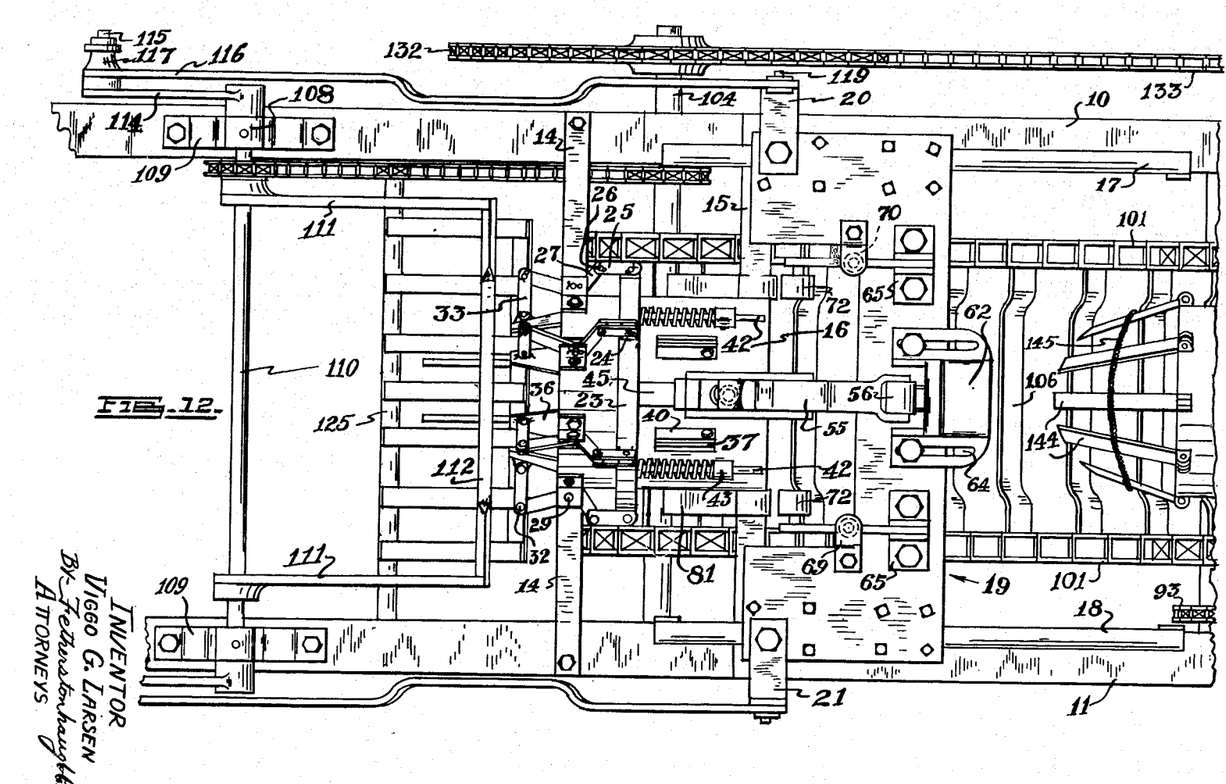
Figure 12 is an enlarged top plan view of a portion of the machine shown in Figure 11.
Figure 13:
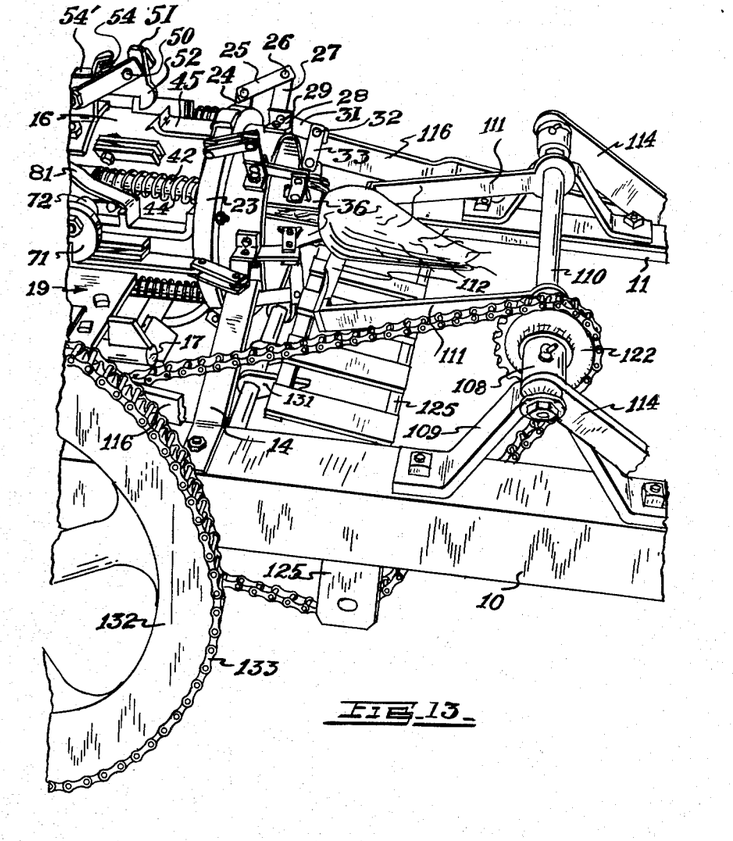
Figure 13 is an enlarged perspective view showing the relationship of the cutter and holders in the cutting position.

The ring 23 is provided with a plurality of forwardly extending spindles 42, as will be seen most clearly in Figures 1, 2 and 5. The spindles 42 are a freely sliding fit within the bushings 43 (seen most clearly in Figures 2 and 5) and upon each spindle 42 is mounted a compression spring 44, which is arranged to be compressed between the rearward face of the bushings 43 and the forward face of the ring 23. The length of the spindles 42, of course, is such that with the ring 23 in its most rearward position, the spindles 42 are still supported by the bushings 43.

The springs 44 are relatively strong springs and are designed continually to urge the ring 23 to the rear, so that the gripper bars 36 will grip anything that is between them with considerable force.

Figure 4:
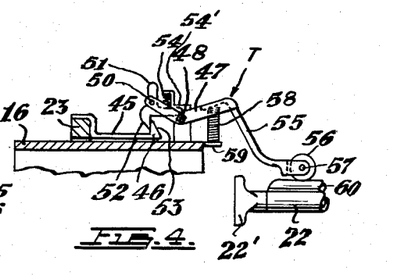
Fig. 4 is an enlarged fragmentary cross-sectional detail of the trigger mechanism which controls the gripper mechanism, the view being taken along the plane 4—4 in Figure 2.

Located at the top of the ring 23 and rigidly secured thereto, for instance, by welding, is the trigger catch plate 45, which will be seen most clearly in Figures 2 and 4. The catch plate 45 extends forwardly of the ring 23 and is provided with the catch lug 46 which is designed to cooperate with the trigger mechanism, indicated generally at T in Figure 4, by means of which the ring 23 is held in its forward position against the influence of the springs 44 until the appropriate moment for its release and consequent actuation of the gripping mechanism.

The trigger mechanism consists of the lever member 47, which is generally of bifurcated structure and is centrally pivoted at 48 on the lug 49, which is secured rigidly, e. g., by welding, upon the center of the top of the topper cylinder 16, at the forward end thereof. Between the bifurcations of the lever member 47, at the rear thereof, is pivoted at 50 the sear 51, which is designed to cooperate with the catch portion 46 in such a way that as the latter is moved forward, the chamfered portion 52 thereof will cooperate with the cam surface 53 on the sear 51 to rotate the sear and permit the catch portion 46 to slide forwardly past the latter, until the sear 51 is free to rotate under the influence of the spring 54 back into its normal position, in which it will prevent the catch portion 46 from once again moving to the rear until release of the trigger mechanism. The sear 51 is prevented from rotating due to the rearward force placed upon it by the catch portion 46 by a stop 54 situated between the bifurcations of the lever member 47, against which the foremost portion of the sear 51 normally abuts. The front end of the lever member 47 is rigidly secured to the arm 55, the forward end whereof is bifurcated to accommodate the cam roller 56 which is arranged freely to rotate upon the pin 57. The compression spring 58, which abuts at one end against the underside of the forward end of the lever portion 47 and at the other end is suitably secured to the lug 59 which extends axially from the front of the top of the topper cylinder 16, continually urges the whole trigger mechanism into the position in which it will retain the catch portion 46 (and thus the ring 23 and its associated gripper mechanism) in cocked position.

The roller 56 is designed to roll along the cam strip 60 which is secured longitudinally along the top of the pusher bar 22. The forward end of the pusher bar is cut away at 61 and at that point the cam strip 60 deflects downwardly. Mounted on the forward edge of the carriage 19 is the housing 62, which contains the inner cam surface 63, which is designed to cooperate with the cam roller 56 as the carriage 19 approaches its rearmost position and force the cam roller 56 downwardly to release the trigger mechanism. Preferably the housing 62, and consequently the inner cam surface 63, is secured to the carriage 19 in a manner which permits a limited amount of adjustment in a longitudinal direction to provide for control of the exact moment when release of the trigger mechanism takes place. The housing 62 may, for instance, suitably be secured by bolts passing through suitable holes in the carriage 19 and through the longitudinal slots 64 in flanges at the bottom of the housing 62.

On either side of the carriage 19 and generally adjacent the inside edge of the arms of the C-shaped plate from which the carriage 19 is formed, are the heavy brackets 65, within which are pivoted at 66 the cocking levers 67. These cocking levers 67 extend rearwardly from the brackets 65 and are of relatively heavy construction. They are pivoted within the brackets 65 in such a way that they may swing up and down in an arc, the plane of which is just inside the inner edge of the arms of the C formed by the carriage plate. The arc through which the cocking levers 67 may swing is limited in a downward direction by stops 68 which are rigidly mounted on the inner side of the guide members 69. The guide members 69 are bent over at their tops to provide seatings for compression springs 70 which compression spring 70 continually urges the cocking levers 67 against the stop 68. Each cocking lever 67 is also provided with the enlarged portion 71 at the rear thereof to form a mounting for the cam rollers 72 on the inner side thereof, while each cocking lever is formed with the lug 73 at the bottom of the rearmost portion thereof.

On each side of the topper cylinder 16, secured to the ring 23 and movable therewith, are a forwardly extending pair of bars 74, which pair of bars 74 are connected at the forward end thereof with a web 75, upon which is secured the cocking lug 76. As mentioned previously, the bars 74 move relatively to the topper cylinder 16 with the ring 23. In doing so, they are supported at the forward end by being in sliding contact with the cross bar 15, which is secured to the topper cylinder 16 in suitable position to provide said support.

On either side of the topper cylinder 16, in position immediately above the upper of each of the bars 74 are the cam studs 77. Freely pivoted on either side of the topper cylinder at 78 are the levers 79. Each lever 79 is provided with the cam track 80, and when at rest the levers are in a position as shown in Figure 5 where the cam tracks 80 rest on the cam studs 77. The arrangement of the cam studs 77 and the levers 79 with their cam tracks 80 is such that they will contact the rollers 71 on the cocking levers 67 as the latter move rearwardly with the carriage 19 to raise the cocking levers 67 so that in their continued rearward movement they will not foul the cocking lugs 76.

To the rear and slightly above the cam studs 77 and levers 79 are the deflector members 81, which are rigidly secured to the topper cylinder on either side thereof in appropriate position to ensure that the cam rollers 72, having been deflected upwardly by the cam tracks 80, are limited in their upward deflection and do not foul the springs 44 or any other parts of the mechanism.

At the front end and secured respectively from the frame members 10 and 11 are the struts 82 and 83, upon the extremities of which are mounted the plowshares 84 and 85, which are of the conventional type used for digging vegetables and the like, such as beets, and which preferably are adjustable as to depth in the usual manner. The struts 87 and 88 are pivotally secured to the frame members 10 and 11. Stationed immediately to the rear of the plowshares and supported by the struts 86 and 87, the latter of which is supported from the struts 88, is the root orienting device indicated generally at RO.

The root orienting device consists of substantially cone-shaped members 89 and 90 which are secured to shaft 91 with their apices facing each other. The shaft 91 which is mounted for rotation in suitable bearings secured at the extremities of struts 87 has secured thereon sprockets 92 which sprockets are adapted to be driven by chain belts 93 which mesh with sprockets 94 secured on a shaft 95. The shaft 95 is rotatably mounted in bearings formed in the extremities of struts 88. The struts 88 have formed thereon rearwardly extending bosses, each boss has formed therein a bore which is adapted to receive the angulated ends of the bars 97 which extend angularly upward, pass through bores formed in brackets 98 which are secured to the underside of frame members 10 and 11. The upper ends of the bars 97 are screw threaded and have threadedly engaged thereon adjustment nuts 100 which abut against the outer face of the brackets 98 thereby providing a means for adjusting the tension of conveyor belt.

The conveyor mechanism generally indicated as C, consists of the endless chains 101 which at their foremost ends fit around and mesh with the teeth on the sprockets 102. To the rear the chains 101 fit around and mesh with the teeth on the drive sprockets 103, which are keyed to the main drive shaft 104 of the machine. The shaft 104 is supported in suitable bearings formed on the brackets 105 which are secured to the frame members 10 and 11. Secured at their ends to the chains 101 are a plurality of parallel, spaced apart, trough-shaped members 106. At suitable predetermined intervals on certain of the trough-shaped members 106 of the conveyor C there is secured a number of tines 106' which are adapted to extract an oriented beet from a beet receiving and holding device 140. The device 140 consists of a substantially semi-circular band 141 which is secured to struts 88 so that it straddles conveyor C, immediately to the rear of beet orienting device RO. Formed on the band 141 are a number of upstanding spaced apart lugs 142 adapted to receive between them and be pivoted thereon, ears 143 to which are attached fingers 144. The fingers 144 extend outwardly over the conveyor belt C and incline downwardly and inwardly towards the conveyor belt to form a pocket adapted to receive and hold the beets delivered thereto by the plowshares and the beet orienting device. The fingers 144 are yieldingly retained in the above described position by a circumscribing helical spring 145. Thus, it will be seen that when the conveyor C is moving in the direction indicated by the arrows, the conveyor arrangement forms an endless trough moving upwardly from the region of the root orienting device RO, through beet receiving and holding device 140, towards the foremost end of the topper cylinder 16. The arrangement of the conveyor is such that it presents the beets which it carries rearwardly and upwardly to the front end of the topper cylinder 16 in timed rotation to the cycle of receiving, gripping and topping so that the root which is foremost on the conveyor rides over the lower lip 107 (see Figure 3) and into the topper cylinder 16.

Within the bearings 108, secured to the top of the bracket members 109 which are mounted upon the frame members 10 and 11, is a cutter bar shaft 110. This shaft has mounted upon it for rotation therewith arms 111, which are suitably bent over at their ends to provide for the mounting of a cutter bar 112, which has formed thereon the knife edge 113. The length of the arms 111 and the arrangement of the mechanism is such that the knife edge 113 swings upwardly past and in very close proximity to the rearmost ends of the gripper bars 36. The ends of the cutter bar shaft 110 extend through the bearings 108 and have rigidly mounted thereon the arms 114. These arms 114 are provided adjacent their ends with the trunnions 115, upon which are mounted for rotation sleeves 117 of carriage actuating links 116, which are provided with suitable bushings 117 for rotation on trunnions 115. The carriage actuating links are provided with the longitudinal slots 118 at their foremost ends, within which are positioned the stub shafts 119, which are mounted on the lug members 20 and 21 in such a way that the links are free to slide the full length of the longitudinal slots 118 during operation of the mechanism to provide for a predetermined dead position in the operating cycle of the carriage 19. The length of the carriage actuating link from the center line of sleeve 117 rotatably mounted on trunnion 115 and the end of the slot 146 is not sufficient to move the carriage to its most rearward position but will when the throw of arm 114 at its dead centre stops pulling the carriage a short distance short of its most rearward travel. At this point in the carriage actuation an auxiliary mechanism consisting of shaft 147, journalled to rotate in bearings mounted on hangers 148 secured to frame members 10 and 11, upon which is secured double lever arms 149. The shaft of these arms 149 is driven at one half of the speed of the shaft 110 so that the tip 150 of the uppermost lever arm will engage with the face 151 of members 152 slidably mounted in slot 153 formed in hangers 153' mounted on the rear face of carriage 19. The members 152 extend inwardly under the carriage 19 and are slidably supported at their inner ends by a bracket 154 secured on the under surface of the carriage cover plate. Each member 152 has formed thereon a shoulder 155 against which abuts a washer 156, a spring 157 positioned between hangers 153 and 154 respectively biases the member 152 outwardly and also preloads the member so that it will not yield until the carriage has been moved to its most rearwardly point of travel. The members 152 will then be forced inwardly against the action of spring 157 by the lever arms 149 until they have rotated beyond the lowermost surface of members 152. The member 152 is also screw threaded at its innermost end and has threadedly engaged thereon a nut 158 which prevents the member 152 from disengagement with the bore in hanger 154.

The cutter bar shaft 110 is driven by means of a drive chain 120 passing around the drive sprocket 121 secured on the main drive shaft 104 and sprocket 122 secured to shaft 110. A suitable snubbing sprocket 123 (which is mounted in a bearing adjustably secured to one of the bearing brackets 109) maintains the drive chain in driving relation with the sprockets 121 and 122.

The drive chain 120 also passes around a sprocket 124 which is rigidly secured on a toppings ejector shaft 125. The toppings ejector shaft is mounted below the frame members 10 and 11 in bearings secured mounted on bearing hangers 126. Mounted for rotation with the toppings ejector shaft 125 is the bifurcated topping ejector arm 127. This topping ejector arm is slightly arc-shaped as shown, and is of such a length that in rotating upwardly past the rear end of the topping cylinder 16, the bifurcated end thereof passes very close to the edge of the cylinder 16 and between the rear ends of two of the gripper bars 36, which will at that time be in the released position. Also mounted on the toppings ejector shaft 125 is the deflector screen 128, which is fixed to the shaft 125 in such an angular relationship to the toppings ejector arm that it may serve as a means for preventing beet roots, which have been cut by the cutter bar and which drop downwardly, from fouling or becoming impaled upon the pointed ends of topping ejector arm, and also to deflect the beet roots onto a conveying belt (not shown).

Rigidly secured to the frame members 10 and 11, and depending downwardly therefrom, are the arms 129, between which is rigidly secured the bar 130. Upon this bar there is affixed thereto in a central position the three rearwardly extending prongs 131. These prongs are in position and are of such a length that on rotation of the topping ejector shaft 125, the bifurcated end of the topping ejector arm 127 passes within the spaces between the prongs 131 and all toppings which may still be clinging thereto are cleaned therefrom and fall to the ground beneath so that the toppings ejector arm as it approaches the bottom of the topping cylinder 16 is clean and free of any debris picked up during the previous cycle of operations.

The main drive shaft 104 is provided at one end thereof with a large drive sprocket 132, which is driven by a drive chain 133, which in turn is driven by a smaller drive sprocket 134. The latter sprocket is mounted on a shaft 135, which projects out of a gear housing box 136, which is mounted on the frame member 10 to the front of the topping mechanism. The gear box 136 contains a conventional gear arrangement which is arranged to transmit power from a universal coupling 137, which is connected to a conventional power take-off 138 of the tractor, of which only the rear portion of the tires 139 thereof are visible.

The machine above described operates as follows:

As the machine is dragged forwardly by the tractor, the plowshares 84 and 85 uproot the beets and as each beet rides up between the plowshares it is gripped by the root orienting device RO, turned through 180° and deposited root foremost in the beet receiving and holding device 140. The conveyor belt C which has attached to it at predetermined intervals the tines 106', extracts a beet from within the receiving and holding device 140 and carries it root foremost upwardly and to the rear until the root portion of the beet rides over the lip 107 at the rear of the topper cylinder 16. The driving mechanism is arranged in such a manner that when the beet arrives at the front end of the topper cylinder 16, the carriage 19 is in its most forward position and is just commencing to be moved to the rear by the drive links 116. As the carriage 19 moves rearward, the head 22' of the push rod 22 contacts the beet at the crown of the root portion and pushes it through the topper cylinder 16. The head 22' of the push rod is formed so that it will invariably contact the actual root, and finally when the carriage has moved to its most rearward position, it will have pushed the crown of the beet root to a position which is in the immediate vicinity of the plane of the rearward ends of the gripper bars 36. If a beet is smaller than normal, the springs 41 secured to the two bottom members 36 will maintain the beets in the centre of the topping cylinder 16 so that the head 22' of pusher rod 22 will not become disengaged therewith before pushing it into the position where the foliage will be gripped by gripper arms 36.

As the carriage 19 moves into its most rearward position, the roller 56 will be deflected downwardly by the inner cam surface 63 of the housing 62. This lowers the front end of the lever 47, raising the sear 51, releasing the catch lug 46, and allowing the ring 23 to move to the rear under the influence of the compression springs 44. This operates the link and bell crank mechanism, shown in detail in Figure 3, causing the gripper bars 36 to pivot about the pivots 39 towards the centre of the topper cylinder 16. The tops of the beets are then gripped securely between the gripper bars 36 and the root of the beet is suspended coaxially to the topper cylinder 16 with its crown resting against the rear ends of the gripper bars 36.

The drive is arranged so that at this particular point the cutter bar is moving upwardly immediately beneath the gripped beet, and as it continues its arcuate path past the ends of the gripper bars 36, it neatly cuts off the root from the tops, which are gripped by the gripper bars, and the root falls onto the deflector 128 where it is guided onto a conveyor belt (not shown). During the actual cutting operation the carriage remains in its fully rearward position because of the allowance for lost motion provided by the slots 111 in the drive links 109. Shortly after the cutting operation is completed, the lost motion is completed and the carriage 19 commences its forward motion. As the carriage commences to move to the front, lugs 73 contact the cocking lugs 76, which, as explained previously, are in rigid attachment with the ring 23, and the ring moves toward the front, compressing the springs 44 until the cam rollers 72 come into contact with the cam lug 77, which forces them in an upward direction to release the contact between the lugs 73 and the cocking lugs 76. By this time, however, the trigger mechanism is in position to retain the ring 23 in a cocked position, because the first motion of the carriage 19 in a forward direction causes the roller 56 to ride up onto the flat portion of the cam strip 60, raising the free end of the cocking lever 67 and lowering the trigger 51 into position where as the ring 23 moves to the front, the surface 52 of the catch lug 46 contacts the sear or surface 53 of the sear 51, rotating it about the pivot 50 so that the catch lug 46 moves past the sear 51. On release of the cocking lugs 76 by the lugs 73, the ring commences to move to the rear once more, under the influence of the springs 44, but is retained in the cocked position by the catch lug 46 being retained, which abuts against the sear 53 as shown in Figure 4. The carriage 19 continues its forward motion until it is a fully forward position, where it remains due to the lost motion provided by the slots 118 until the next beet has mounted the conveyor into position for the next cycle of operations.

While the carriage 19 is moving to the front, the toppings ejector moves in its arcuate path and the two prongs thereof move upwardly between the two lower gripper bars 36 to catch the toppings which are now released by the gripper bars due to the recocking of the gripper mechanism and the toppings are ejected to the rear. As explained previously, any toppings which tend to stick to the bifurcated end of the toppings ejector arm 127 are removed by passage between the prongs 131 before the next ejection operation takes place.

As will be apparent from the foregoing, the timing of the various operations is important, and the relative speeds at which the various portions of the machine are driven are also important. For instance, commencing with the operation of the root orienting mechanism RO, this must place the beet root foremost on the conveyor just at the time that the carriage 19 reaches its foremost position. The lost motion caused by the slots 111 must be sufficient to allow the beet to be carried up the conveyor into position for the forward stroke of the push rod 22, while the lost motion of the carriage in its rearward position must be sufficient to permit the cutter bar 112 to complete the lopping off of the root from the toppings before it commences to recock the mechanism, and the cocking action must be complete before the toppings ejector arm moves between the ends of the gripper bars to eject the toppings.

What I claim as my invention is:

1. A device for topping sugar beets and the like comprising a frame or chassis; a hollow, generally cylindrical topper housing secured to said frame in substantially axial alignment therewith; means for supplying beets, with their roots oriented to the rear, to the forward end of said topper housing; gripper means including at least four gripper bars pivoted at their forward ends to the inside of said topper housing, and spring loaded actuating means for said gripper bars, said actuating means being connected to the rearward ends of said gripper bars and being adapted on actuation to swing the rearward ends of said gripper bars inwardly to a gripping position; a carriage slideably mounted for longitudinal reciprocation with respect to said frame or chassis forward of said topper housing; a rearwardly extending push rod mounted on said carriage in substantially axial alignment with said topper housing for reciprocation into and out of said topper housing as said carriage reciprocates longitudinally of said frame or chassis; releasable catch means mounted on said topper housing in position to co-act with said spring loaded actuating means for said gripper bars and retain the latter in a cocked position, said releasable catch means including a forwardly extending depressible trigger release arm; means mounted on said carriage cooperating with said trigger release arm to depress the same as said carriage approaches its rearmost position during reciprocation; cocking means for said spring loaded actuating means comprising a cocking lug projecting therefrom, catch arm means on said carriage for engaging said cocking lug and carrying the same forward with the forward reciprocatory movement of said carriage; cam lug means on said topper housing positioned to engage said catch arm means as it moves forwardly of a position which corresponds to the cocked position of said spring loaded actuating means to release said catch arm means from engagement with said cocking lug; a cutter shaft mounted transversely on said frame or chassis to the rear of said topper housing; a cutter blade mounted substantially parallel to said cutter shaft on arms secured and rotatable therewith to swing said cutter blade upwardly past the rearward end of said topper housing in close proximity thereto; toppings extractor means including a second shaft transversely mounted on said frame or chassis and an extractor arm secured to said second shaft and arranged to swing upwardly between the rearward ends of said gripper bars when the latter are in the cocked position; and drive means for said device arranged to drive said carriage in reciprocating forward and rearward movement and rotate said cutter shaft and said second shaft in positive synchronization whereby said cutter swings upwardly past said topper housing when said carriage is in its rearmost position, and said toppings extractor swings upwardly between the ends of said gripper bars when said carriage is in its forward position.

2. A device as defined in claim 1 in which said means for imparting back and forth reciprocation to said carriage means includes; a shaft driven by said drive means; an arm mounted on said shaft; stud means on said carriage; and link means operatively connected at one end to the end of said arm and at the other end to said stud means, whereby rotation of said shaft causes back and forth reciprocation of said carriage means on said slide means.

3. A device as defined in claim 2 in which said link means is provided with means for providing a period of lost motion between movement to the rear of said carriage means, and movement of the same forward again and in which auxiliary means also driven by said drive means are provided for imparting a final rearward motion to said carriage means during said period of lost motion.

4. A device as defined in claim 3 in which said means for providing a period of lost motion comprises a longitudinal slot in said link means, said stud means on said carriage being mounted slidably and rotatably in said slot.

5. A device as defined in claim 3 in which said auxiliary means includes; a shaft mounted for rotation by said drive means at half the speed of rotation of the shaft which drives said means for providing back and forth reciprocation of said carriage means; rotating means secured to said shaft, said rotating means being provided with two contact portions positioned at 180° to each other; a contact area at the forward end of said carriage; said contact means being arranged to contact said contact area on said carriage to impart a final rearward motion to said carriage.

6. A device as defined in claim 1 in which said gripper actuating means comprises; a ring member surrounding said topper housing and mounted thereon for limited longitudinal movement; a bell crank for each of said gripper bars pivoted at its elbow on pivot means on the rearward end of said topper housing, one of the free ends of said bell crank being pivoted to pivot means on the corresponding gripper bar; link means for each of said bell cranks, each said link means being pivotally secured at one end to the remaining free end of its associated bell crank and at the other end to pivot means secured to said ring member; and spring means arranged continually to urge said ring member to the rear, and consequently urge said gripper means to the gripped position by means of said bell cranks and links.

7. A device as defined in claim 8 in which the two lowermost of said gripper bars are provided with leaf springs secured in the region of their foremost ends to said gripper bars and slanting slightly inwardly away from said gripper bars at their forward ends to ensure a positive grip and correct positioning of undersize beets fed to said device.

8. A device as defined in claim 6 in which said releasable catch means comprises a sear lever pivotally mounted in suitable bracket means on the top of said topper housing, the free end thereof having a downwardly facing sear lug arranged for cooperation with catch means on said ring member to retain said spring loaded actuating means in cocked position; spring means continually urging said free end of said sear lever downwardly; a lever member pivoted substantially coaxially to said sear lever, said lever member having a rearwardly extending arm pivoted to a rearward portion of said sear lever, and a forwardly and downwardly extending trigger arm provided at its extremity with a cam roller arranged to follow a cam strip formed along the top of said push rod; spring means continually urging said lever member in a direction tending to keep said sear in engagement with said catch means; and cam means for depressing said trigger arm comprising a cam strip running along the top of said push rod and having a cam depression at the forward end thereof, and a cam member mounted on said carriage means above said cam depression arranged to force said roller into said depression whereby during the final rearward movement of said carriage means, said cam roller follows said cam depression, lowering the trigger arm of said lever member, raising said sear lever and releasing said catch means.

9. A device as defined in claim 1 in which said catch arm means on said carriage comprises a lug on said carriage; a cocking arm pivoted to said lug and extending rearwardly thereof; seating means for said cocking arm arranged to seat the latter in generally horizontal position; spring means arranged to urge said cocking arm downwardly on to said seating means; and a catch lug formed on the end of said cocking lever, said catch lug being arranged to cooperate with the cocking lug on said spring loaded actuating means to move the latter to said cocked position during movement forward of said carriage means.

10. A device as defined in claim 9 which comprises; a roller mounted on the inner side of said cocking lever; a cam lug secured to said topper housing in position to engage said roller as said carriage means moves forward at a point in the travel thereof just after said cocked position has been reached, to swing said cocking lever upwardly out of engagement with said cocking lug.

11. A device as defined in claim 10 comprising a deflector member pivoted at its rearward end to said topper housing and arranged normally to rest with its forward end on said cam lug, said deflector member having a cam surface arranged, during rearward movement of said carriage to cooperate with said roller on said cocking arm to deflect the cocking arm upwardly as said lug passes said cam lug to prevent fouling of said cam lug and said catch lug during forward movement of said carriage and then allow said cocking lever to drop into position behind said cam lug and said cocking lug, said deflector member also being arranged to be deflected upwardly out of the way by said roller during movement forward of said carriage means.

12. A device as defined in claim 11 comprising a second deflector member secured to said topper housing and arranged positively to deflect said roller downwardly after it has been deflected upwardly by said first mentioned deflector means, in the event of failure of said spring means to assert itself to lower said cocking levers in the required manner.

13. A device as defined in claim 1 in which said toppings ejector arm is formed with a pair of tines at the end thereof and comprising stripping means comprising three fingers mounted in fixed position beneath said topper cylinder and arranged in position so that in rotating upwardly the tines of said extractor arm pass between adjacent pairs of said fingers whereby said extractor tines are stripped of any toppings still adhering thereto.

14. A device as defined in claim 13 wherein deflector means are provided, comprising a grill mounted for rotation with the shaft of said toppings extractor means and arranged to deflect severed roots clear of said toppings extractor means in a predetermined direction.

References Cited in the file of this patent

UNITED STATES PATENTS

| Number | Name | Date |
| --- | --- | --- |
| 2,238,247 | Colwill | Apr. 15, 1941 |